(12) United States Patent
Cha

(10) Patent No.: US 6,765,758 B1
(45) Date of Patent: Jul. 20, 2004

(54) SUBAMBIENT PRESSURE SLIDER INCLUDING SECONDARY STRUCTURES IN THE SUBAMBIENT AREA

(75) Inventor: Ellis T. Cha, San Jose, CA (US)

(73) Assignee: SAE Magnetics (H.K.) Ltd., Hong Kong (HK)

(*) Notice: Subject to any disclaimer, the term of this patent is extended or adjusted under 35 U.S.C. 154(b) by 0 days.

(21) Appl. No.: 09/186,212

(22) Filed: Nov. 3, 1998

(51) Int. Cl.[7] .............................................. G11B 5/60
(52) U.S. Cl. .................................................. 360/236.1
(58) Field of Search .......................... 360/103, 235.9, 360/236.1, 236.7, 236.8

(56) References Cited

U.S. PATENT DOCUMENTS

| | | | | |
|---|---|---|---|---|
| 5,062,017 A | * | 10/1991 | Strom et al. | 360/103 |
| 5,251,083 A | * | 10/1993 | Takeuchi et al. | 360/103 |
| 5,274,518 A | * | 12/1993 | Chapin et al. | 360/103 |
| 5,343,343 A | * | 8/1994 | Chapin | 360/103 |
| 5,515,219 A | * | 5/1996 | Ihrke et al. | 360/103 |
| 5,726,830 A | * | 3/1998 | Koishi et al. | 360/103 |
| 5,872,685 A | * | 2/1999 | Park et al. | 360/103 |

* cited by examiner

*Primary Examiner*—Brian E Miller
(74) *Attorney, Agent, or Firm*—Kenyon & Kenyon

(57) ABSTRACT

An improved slider design is presented including first and second rails, where the rear portions of the rails have an angle greater than 0°. Adjacent to an inside edge of at least one of the rails, a secondary structure is placed having a height less than that of the rails. Though subambient pressure is present between the first and second rails, the pressure is greater at the secondary structure. In one embodiment, the pressure at the secondary structure is less than one atmosphere over all diameters of the moving recording medium. The slider design of the present invention provides a "stiffer" air bearing, in that the slider resists changes due to gram loading to achieve a narrow distribution in flying height variations as well as roll and pitch variations.

15 Claims, 4 Drawing Sheets

SUBAMBIENT PRESSURE SLIDER INCLUDING SECONDARY STRUCTURES IN THE SUBAMBIENT AREA

FIELD OF THE INVENTION

The present invention is directed to air bearing slider designs in disk drives. More particularly, the present invention pertains to a multiple level surface configuration for a subambient pressure air bearing slider.

BACKGROUND OF THE INVENTION

Hard disk drives are common information storage devices essentially consisting of a series of rotatable disks that are accessed by magnetic reading and writing elements. These data transferring elements, commonly known as transducers, are typically carried by and embedded in a slider body that is held in a close relative position over discrete data tracks formed on a disk to permit a read or write operation to be carried out. In order to properly position the transducer with respect to the disk surface, an air bearing surface (ABS) formed on the slider body experiences a fluid air flow that provides sufficient lift force to "fly" the slider and transducer above the disk data tracks. The high speed rotation of a magnetic disk generates a stream of air flow or wind along its surface in a direction substantially parallel to the tangential velocity of the disk. The air flow cooperates with the ABS of the slider body which enables the slider to fly above the spinning disk. In effect, the suspended slider is physically separated from the disk surface through this self-actuating air bearing. The ABS of a slider is generally configured on the slider surface facing the rotating disk, and greatly influences its ability to fly over the disk under various conditions.

Some of the major objectives in ABS designs are to fly the slider and its accompanying transducer as close as possible to the surface of the rotating disk, and to uniformly maintain that constant close distance regardless of variable flying conditions. The height or separation gap between the air bearing slider and the spinning magnetic disk is commonly defined as the flying height. In general, the mounted transducer or read/write element flies only approximately a few micro-inches above the surface of the rotating disk. The flying height of the slider is viewed as one of the most critical parameters affecting the magnetic disk reading and recording capabilities of a mounted read/write element. For example, there are many advantages for reducing or having a relatively small flying height. A relatively small flying height allows the transducer to achieve greater resolution between different data bit locations and magnetic fields emanating from closely defined regions on the disk surface. Also, a low flying slider is known to provide improved high density recording or storage capacity of magnetic disks which is usually limited by the distance between the transducer and the magnetic media. Narrow separation gaps permit shorter wavelength signals to be recorded or read as a result. At the same time, with the increasing popularity of lightweight and compact notebook type computers that utilize relatively small yet powerful disk drives, the need for a progressively smaller slider body with a lower flying height has continually grown.

It has also been observed that a constant flying height provides desirable benefits which may be more readily achieved through particular ABS designs. Fluctuations in flying height is known to adversely affect the resolution and the data transfer capabilities of the accompanying transducer or read/write element. The amplitude of the signal being recorded or read does not vary as much when the flying height is relatively constant. Additionally, changes in flying height may result in unintended contact between the slider assembly and the magnetic rotating disk. Sliders are generally considered to be either direct contacting, pseudo-contacting or flying sliders which is descriptive of their intended contact with a rotating disk. Regardless of the type of slider, it is often desirable to avoid unnecessary contact with the surface of the spinning magnetic disk so as to reduce the wear on both the slider body and the disk. The deterioration or wear of the recording media may lead to the loss of recorded data, while slider wear may also result in the ultimate failure of the transducer or magnetic element.

What often causes changes to the flying height is the continual high speed movement of the slider across the rotating disk while performing read or write operations. For example, depending on the radial position of the slider, the respective linear velocity of the disk varies. Higher velocities are observed at the outer edge of the rotating disk, while lower velocities are found at the inner edge. As a result, the air bearing slider flies at different relative speeds at different radial positions relative to the disk. Because sliders typically fly higher at higher velocities, there is a tendency for flying heights to increase when positioned above the outer regions of the disk. At the same time, lower velocities at the inner regions of the disk cause the slider to fly lower. Accordingly, slider designs must account for the noticeable effect that variations in radial position, and relative velocity, have on the flying height.

The flying height of a slider is also adversely affected by changes in skew. The skew angle is defined and measured as the angle formed between the longitudinal axis of the slider body and the direction of the air flow tangential to the disk rotation. When the mounted slider is positioned near the inner or outer edges of the spinning disk, its longitudinal axis is often skewed in relation to the direction of the air flow. The longitudinal axis of the slider may be defined as a center line of reference running along the length of the slider body. These angular orientations or skew angles typically vary as a rotary actuator arm and gimbal suspension assembly turns about its pivot point thereby moving the slider in an arcuate path across the rotating disk. In view of the growing demand for compact disk drives having relatively smaller actuator arms, larger skew angles are ever more present because of the shortened arm length. It has often been observed that at skew values above zero, sliders are pressurized at reduced values which cause an undesirable decrease in flying height. Even a relatively moderate skew angle range adversely affects the flying capabilities of a slider. As a result, ABS designs continually attempt to minimize slider sensitivity to changes in skew.

Another fluctuation in flying height may be identified as slider roll. The roll angle is measured and defined by the difference in flying height between the longitudinal sides of the slider. Whenever a slider flies at skew with respect to the direction of the air flow, an unequal pressure distribution tends to occur between the ABS and the disk. This imbalance causes slider roll where one side of the slider body is closer to the disk surface than the other side. A slider, however, is preferably positioned at a constant slider roll regardless of any changes in the flying conditions including differences in tangential velocity between the inner and outer tracks of the rotating disk, and continuous lateral movement above the surface of the disk or varying skew angles.

As shown in FIG. 1 an ABS design known for a common catamaran slider 5 may be formed with a pair of parallel rails 2 and 4 that extend along the outer edges of the slider surface facing the disk. Other ABS configurations including three or more additional rails, with various surface areas and geometries, have also been developed. The two rails 2 and 4 typically run along at least a portion of the slider body length from the leading edge 6 to the trailing edge 8. The leading edge 6 is defined as the edge of the slider that the rotating disk passes before running the length of the slider 5 towards a trailing edge 8. As shown, the leading edge 6 may be tapered despite the large undesirable tolerance typically associated with this machining process. The transducer or magnetic element 7 is typically mounted at some location along the trailing edge 8 of the slider as shown in FIG. 1. The rails 2 and 4 form an air bearing surface on which the slider flies, and provide the necessary lift upon contact with the air flow created by the spinning disk. As the disk rotates, the generated wind or air flow runs along underneath, and in between, the catamaran slider rails 2 and 4. As the air flow passes beneath the rails 2 and 4, the air pressure between the rails and the disk increases thereby providing positive pressurization and lift. Catamaran sliders generally create a sufficient amount of lift, or positive load force, to cause the slider to fly at appropriate heights above the rotating disk. In the absence of the rails 2 and 4, the large surface area of the slider body 5 would produce an excessively large air bearing surface area. In general, as the air bearing surface area increases, the amount of lift created is also increased. Without rails, the slider would therefore fly too far from the rotating disk thereby foregoing all of the described benefits of having a low flying height. As illustrated in FIG. 1, a flexible gimbal (not shown) often provides the slider with multiple degrees of freedom such as vertical spacing, or pitch angle and roll angle which describe the flying height of the slider.

Although catamaran sliders are initially effective in providing an adequate flying height, they are especially sensitive to varying skew angle ranges and other adverse flying conditions. When the skew angle is increased, such as when the flying slider moves across the rotating disk, the air pressure distribution beneath the rails may become distorted. By accessing both inner and outer portions of a disk at relatively high speed, air is introduced in an uneven amount under each rail which typically causes slider roll as depicted in FIG. 1. As a result, the slider experiences an uneven distribution of pressure which may cause the slider to roll in one direction such that the flying height is not uniform between the ABS rails. The mounted transducer may therefore be unable to operate effectively or accurately perform its data transfer operations. Regardless of the sensitivity of the ABS rails to various skew ranges and other adverse flying conditions, this rail design is widely acknowledged as a general configuration that provides effective pressurization or lift to enable a slider to fly.

In order to counteract the positive pressurization of the flying slider body to provide a low and constant flying height, it is known to form an ABS that also provides negative or subambient pressurization to pull or draw the slider body towards the disk. For example, negative pressure air bearing (NPAB) or self loading sliders have been known to provide a counteracting negative pressure load. In this dual pressurization scheme, the ABS may be generally formed with a leading edge, a trailing edge, side rails, and a cross-rail that extends between the side rails in a basic H-shaped orientation. The cross-rail, which is often positioned closer to the leading edge than the trailing edge of the slider, creates a subambient pressure region trailing the cross-rail and in between the side-rails. The subambient pressure region creates a negative pressure or load that counteracts the positive pressure generated along the side rail portion of the ABS. This counteraction of negative and positive forces has been known to increase the stability and air bearing stiffness of the slider, provide rapid slider take-off, and reduce its sensitivity to variations in conditions such as changing disk velocity and radial movement which cause fluctuations in flying height. The compensating changes in positive and negative pressure, in accordance with the varying velocity between the inner and outer tracks of the disk, contributes to the overall objective of maintaining a substantially constant and steady flying height. However, the offsetting forces created in a subambient pressurization scheme may often present undesirable effects that actually cause variations in flying height. A NPAB slider often exhibits noticeable roll as well, and a reduction in flying height at skewed conditions because of unequal pressurization or distribution of air beneath the rails.

Another type of ABS rail modification that has been developed is generally known as a transverse pressurization contour (TPC). A TPC may be formed on ABS rails at various locations along the edges of their air bearing surface areas. This has been observed to provide some reduction in flying height variations at skew angles in certain applications. When there is a transverse component of air flow directed across the face of the rail, the contour provided by a transverse edge of a TPC rail may experience positive pressurization while a counter balancing negative pressurization is produced in a contour along the other transverse edge of the rail. As a result, the overall pressure distribution across the ABS may remain relatively unchanged over some range of varying skew angles where the transverse component of air flow tends to cause unequal pressurization.

All of the aforementioned ABS configurations and modifications for air bearing sliders attempt to achieve a low and constant flying height. Different degrees of effectiveness are provided by these ABS designs which overall do not control flying height, or pitch and roll angles very well. For example, many existing ABS designs have been observed to exhibit an extremely increased slider roll angle over outer tracks regions of a disk. These configurations also typically fail to control the increase in slider pitch angle when moving from inner track to the outer track regions. Thus, there exists a need for an ABS configuration for an air bearing slider that effectively maintains constant flying height and controls roll angle regardless of constantly changing flying conditions such as the difference in relative velocity at the outer and inner regions of a disk, the relative positioning of a slider over a rotating disk, and varying skew angles ranges.

SUMMARY OF THE INVENTION

The present invention provides a subambient pressure air bearing slider with an air bearing surface (ABS) that provides a low and constant flying height in the presence of varying directional air flow. Also, the slider design of the present invention provides a "stiffer" air "bearing," in that the slider resists changes due to gram loading to achieve a narrow distribution in flying height variations as well as roll and pitch variations.

The stiff air bearing of the present invention is achieved by providing a secondary structure adjacent to at least one of the rails and in the sub-ambient pressure area of the slider. The secondary structure has a height less than the height of the rails and works to reduce the magnitude of the loading caused by the sub-ambient pressure area depending on the skew angle of the slider.

DETAILED DESCRIPTION OF THE INVENTION

Figure 3:
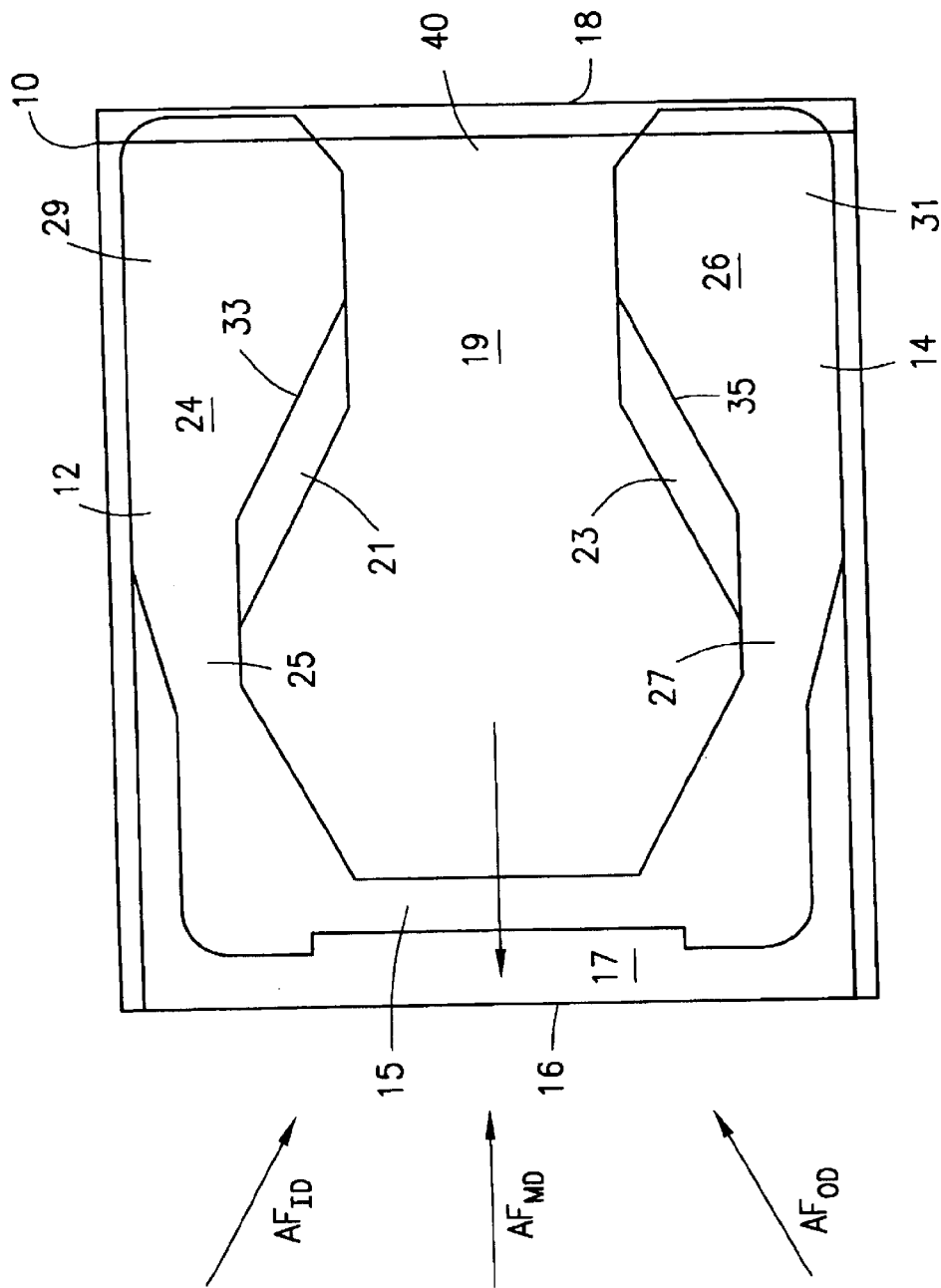
FIG. 3 is a bottom plan view of a subambient pressure slider constructed according to a an embodiment of the present invention.

FIG. 3 is a plan view of the bottom side of an ABS 10 for a subambient pressure slider in accordance with the present invention. It will be understood that for purposes of describing particular features of an ABS as follows, the entire slider body, which may be formed from a substrate material such as $Al_2O_3TiC$, is not shown. The ABS 10 illustrated in FIG. 3 includes a pair of rails 12 and 14 each having effective air bearing areas 24 and 26. The inner rail 12 and the outer rail 14 generally extend from the leading edge 16 toward the trailing edge 18 of the ABS. As shown in FIG. 3, the ABS rails 12 and 14 are shaped in a desired configuration by conventional techniques in accordance with one aspect of the present invention. Rails 12 and 14 are connected together at the leading edge 16 of the slider by a leading portion 15. In this embodiment of the present invention, the leading portion 15 forms a step with the support area 17 of the slider body. In FIG. 3, this step formation is created by etching the slider body in this area to a depth of between 10 and 50 microinches, for example. The step formation extends between the leading edge 16 and the leading portion 15 as well as to the outer sides of the rails 12 and 14. Alternatively, a ramp structure (as known in the art) can be used that extends from the leading edge 16 of the slider 10 to the leading portion 15.

In FIG. 3, a sub-ambient pressure area 19 is provided that extends between the rails 12 and 14 and the leading portion 15. The sub-ambient pressure area 19 can be formed, for example, by etching that area to a depth of between 70 and 200 microinches (e.g., 100 microinches). Another embodiment of the present invention is shown in FIG. 3 from the bottom view of a preferable subambient pressure air bearing slider. The general direction of air flow with respect to the changing position of the slider ABS 10 at the outer, middle and inner regions of a disk, is illustrated in FIG. 3 by arrows $AF_{OD}$, $AF_{MD}$, and $AF_{ID}$, respectively. It must be recalled that sliders are commonly attached to actuator arm and gimbal assemblies that rotate about a pivot point thereby changing the direction of the air flow with respect to the ABS of the slider as the slider moves across the rotating disk in between inner and outer diameter regions. While the present invention is applicable to sliders of various sizes, the scale provided in FIG. 3 shows the overall dimensions of the slider ABS 10 to be approximately 0.05 inches in length, 0.039 inches in width and 0.012 inches in height (not shown). Sliders having these relative dimensions are generally referred to as picosliders. As known in the art, the sub-ambient pressure region produces a pressure region less than 1 atmosphere (atm) when the slider is flying over the surface of moving magnetic disk. This sub-ambient pressure draws the slider closer to the moving disk counteracting the pressurization effect caused by the ABSs 24 and 26 of the slider.

Referring to FIG. 3, rails 12 and 14 have a "balloon shape" so as to provide effective air bearing surface areas unique to each rail, respectively. Details concerning this shape and its effects on flying height are described in U.S. patent application Ser. No. 08/705,774, filed on Aug. 30, 1996, the disclosure of which is hereby incorporated by reference in its entirety. For example, the inner rail 12 is formed with an effective air bearing surface area and compression length. As the skew angle changes and the slider moves towards outer diameter regions, the decrease of the effective surface area and compression length due to side leakage (reduction in lift where air leaks out of the sides of the rail) is minimized as a result of the shaped air bearing surface of the rails 12 and 14 shown in FIG. 3. When the slider moves to inner diameter regions, the effective surface area and compression length also decreases for the same reasons. Again, the uniquely configured air bearing surface minimizes the effect of the loss in effective surface area and compression length at inner diameter regions. The unique configuration of the air bearing surface for the outer rail 14 provides similar results at various disk regions.

According to an embodiment of the present invention, slider 10 is provided with secondary structures 21 and 23 to the rails 12 and 14, respectively. Secondary structures 21 and 23 are placed in the subambient pressure area 19 and have a height which is less than the height of the rails 12 and 14. In this embodiment, the secondary structures 21 and 23 are etched to a depth equal to the support area 17. As stated above, rails 12 and 14 have a "balloon" shape characterized by a neck portion 25, 27 and a rear portion 29, 31 having a width greater than that for the neck portion. Each rear portion 29, 31 includes an inside rail edge 33, 35 that faces the subambient pressure area 19 of the slider 10. In particular, each of the inside rail edges are angled with respect to the longitudinal axis 40 of the slider 10.

In operation, when slider 10 is at the outer diameter of the moving disk, air flow $AF_{OD}$ impinges on the secondary structure 23 and creates pressurization that is greater than the low, subambient pressure of area 19 but less than 1 atm. The secondary structure 23 has a width of approximately 6.0 mils (or 0.006 inches) in this embodiment. Secondary structure 21 will also have a pressurization greater than the subambient pressure of area 19 but less than the pressure at secondary structure 23 (e.g., on the order of 0.7 atm). As the slider 10 moves from the outer diameter to the inner diameter, pressurization in the secondary structure 23 decreases and the pressurization at secondary structure 21 increases to an amount less than 1 atm. The secondary structure 21 has a width of approximately 5.0 mils (or 0.005 inches) in this embodiment. The width (measured from the inside edges 33, 35 to the subambient pressure area 19) of the secondary structures 21, 23 can be selected so as to increase the area for the pressurization described above. For example, in the embodiment of FIG. 3, the width of secondary structure 21 is greater than that for secondary structure 23. Accordingly, when the slider is at an outer diameter, the pressure in subambient pressure area 19 is at its lowest (i.e., providing the highest amount of attraction to the moving disk), and the secondary structure 21 works to offset this effect (i.e., increase the total pressurization in the subambient pressure area). The width of secondary structure 23 is selected to achieve the desired pressurization. When the slider is at an inner diameter, the pressurization in the subambient pressure area is higher, and it may be advantageous to have a more narrow secondary structure (i.e., structure 23) to offset such an affect. One skilled in the art will appreciate that the slider design of FIG. 3 can be modified so that only one secondary structure is provided.

It should be noted that in order to avoid relatively large skew angles which are known to significantly hinder slider pressurization and lift, it is common to define zero skew angle near middle diameter regions. In this manner, skew angle values remain relatively low regardless of whether the slider is skewed towards the outer or the inner regions of a disk. Of course, zero skew may be defined near the inner region of a disk where the effective surface area and compression length of the ABS may be greatest in an attempt to compensate for the relatively low air velocity in this region. But the skew angle values generally become significantly higher in this arrangement, and tend to have a counterproductive effect on pressurization of the slider as it moves outward towards other regions of the disk. In either example, when flying at skew, the drop in pressurization and lift ordinarily occurring with generally rectangular shaped rails is minimized by the shaped air bearing surface and secondary structures formed in accordance with the present invention. The overall result of the ABS configurations provided by the present disclosure is a slider that is capable of flying at a more constant height while at skew, and with greater control of pitch and roll angles.

Figure 4:
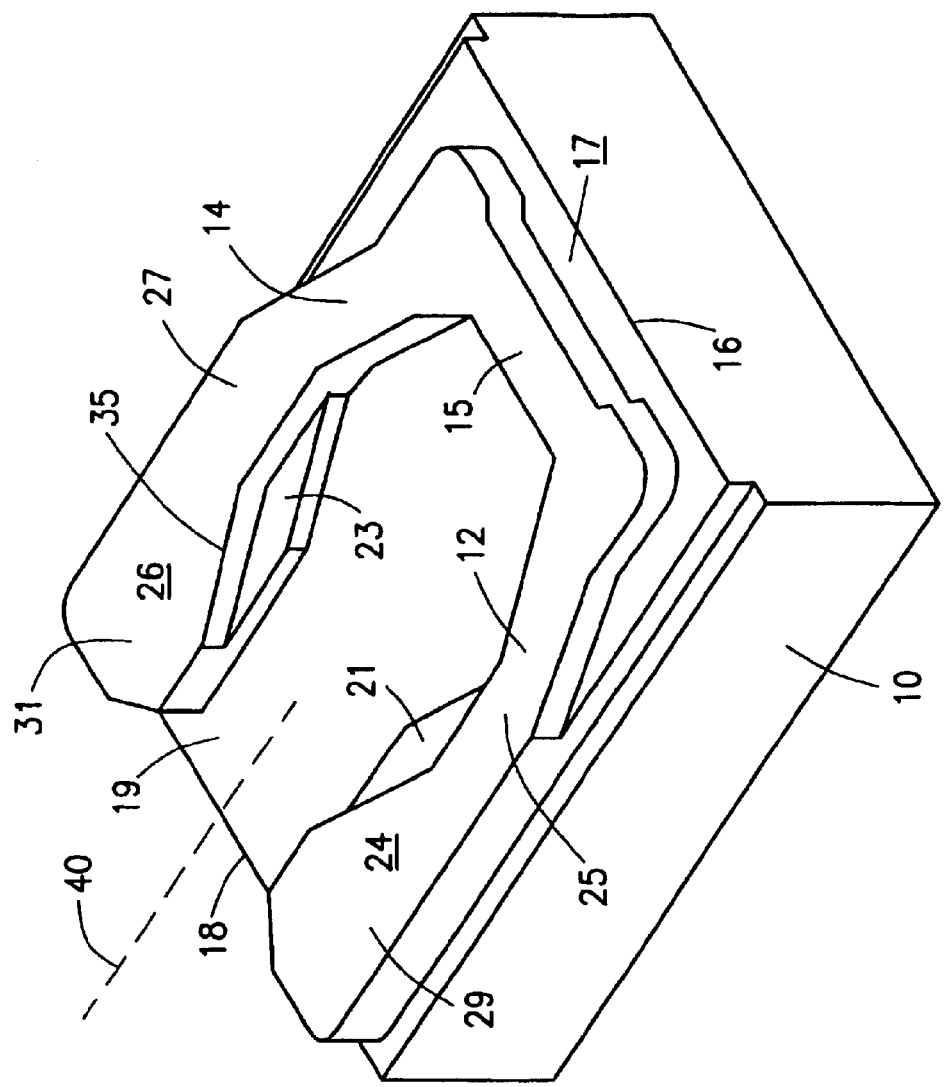
FIG. 4 is a perspective view of the slider of FIG. 3.

In FIG. 4, a perspective view of the slider 10 of FIG. 3 is shown.

Figure 1:
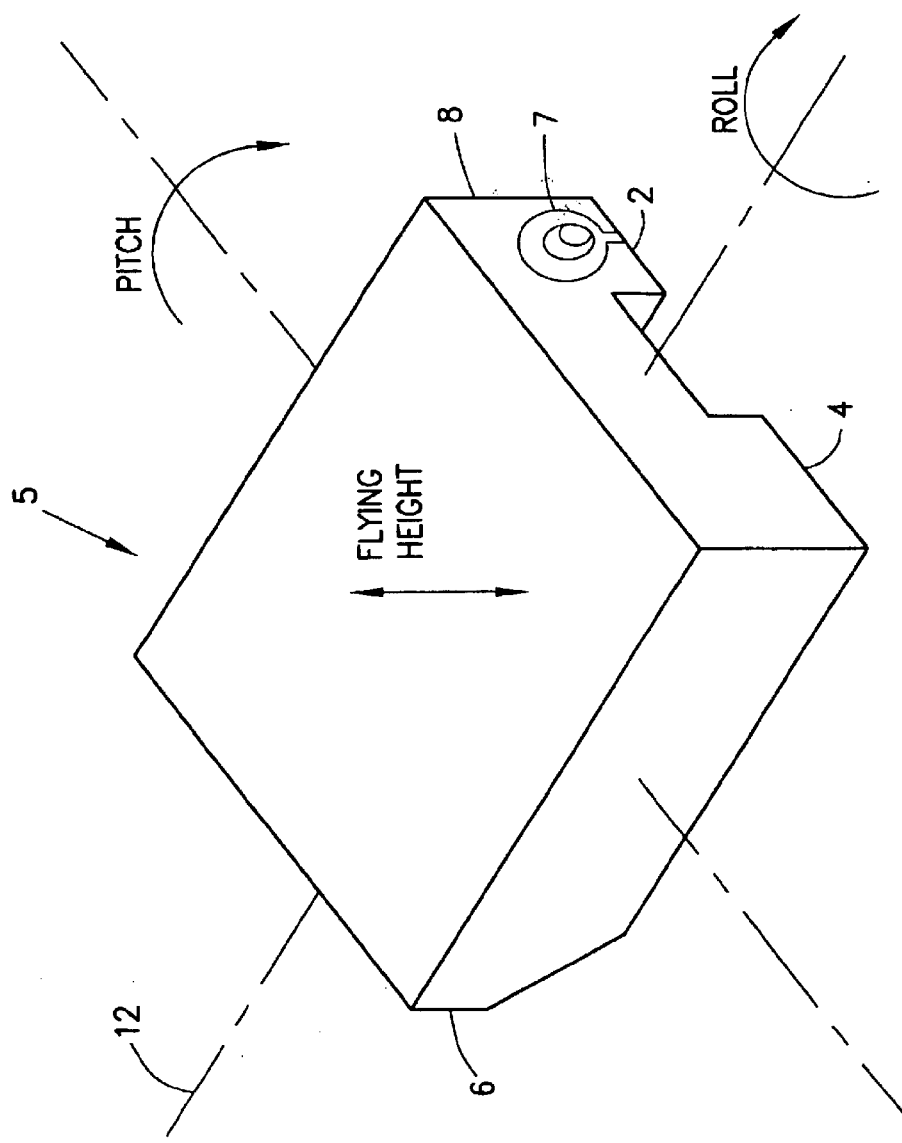
FIG. 1 is a perspective view of a flying slider with a read and write element assembly having a tapered conventional catamaran air bearing slider configuration.
Figure 2:
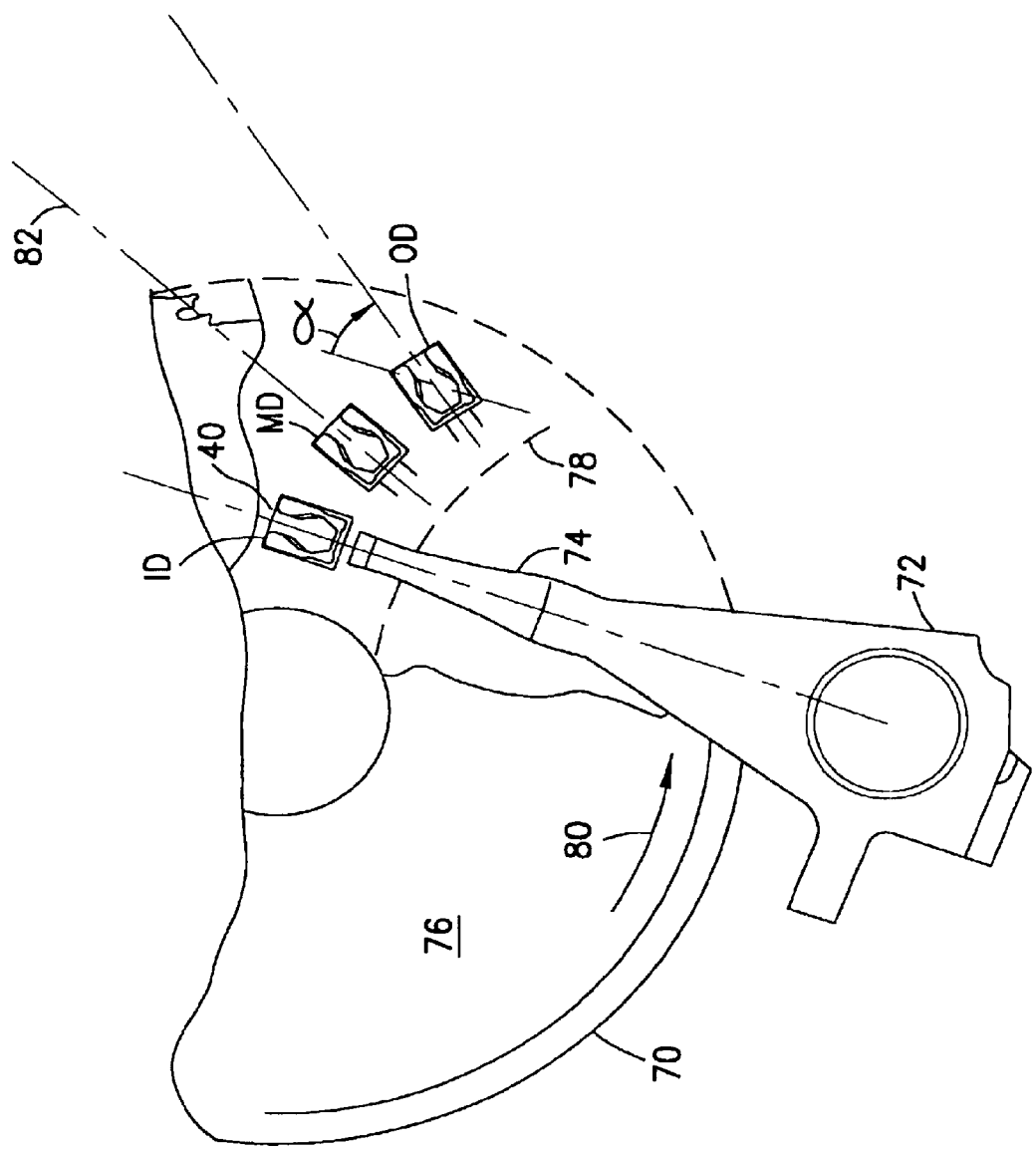
FIG. 2 is a plan view of a mounted air bearing slider in accordance with the present invention (not drawn to scale).

Referring to FIG. 2 another embodiment of the present invention is shown where the mounted slider (not drawn to scale) is suspended below the rotating magnetic disk 70 by an actuator or track arm and gimbal suspension assembly 72. The slider is mounted onto a gimbal 74 which allows for varying degrees of free movement of the slider relative to the disk surface 76. The arm may move in a linear motion in a manner known as linear access (not shown) where the read/write element or head moves across a rotating disk in a relatively straight path. Alternatively, the arm and gimbal assembly 72 may rotate about an axis or pivot point in what is commonly referred to as a rotary actuator. The gimbal 74 and slider may be joined by a track arm and gimbal suspension assembly 72 through a rotary actuator which positions the slider over selected individual data tracks on the magnetic surface 76 in an arcuate path 78. In either scheme, the gimbal 74 provides a flexible yet resilient connection that allows the flying slider and accompanying transducer to follow the topography of the spinning disk at different disk locations. In this embodiment, when the slider ABS 40 (shown in FIGS. 3 and 4 as element 10) is positioned in the middle diameter region (MD) of the rotating disk, the skew angle is zero since the longitudinal axis of the slider is parallel with the air flow. An intermediate effect of the pressurization due to the secondary structures 21, 23 is seen in the middle diameter regions of the disk. However, as the slider ABS 40 moves out towards outer diameter regions (OD), the air begins to flow substantially perpendicular to the secondary structure 23 to generate increased pressurization in that area. When the slider ABS 40 moves towards inner diameter regions (ID), the air tends to flow substantially perpendicular to the secondary structure 21 to provide necessary pressurization in order to generate increased pressurization in that area.

While the present invention has been described with reference to the aforementioned applications, this description of the preferred embodiments is not meant to be construed in a limiting sense. It shall be understood that all aspects of the present invention are not limited to the specific depictions, configurations or dimensions set forth herein which depend upon a variety of aerodynamic principles and variables, and may be determined, for example, through computer simulation procedures using computer simulation programs such as that developed at the Computer Mechanics Laboratory at the University of California, Berkeley, Calif. Various modifications in form and detail of the disclosed apparatus, as well as other variations of the present invention will be apparent to a person skilled in the art upon reference to the present disclosure. It is therefore contemplated that the appended claims shall cover any such modifications or variations of the described embodiments as falling within the true spirit and scope of the present invention.

What is claimed is:

1. A subambient pressure air bearing slider comprising:
   a slider body defined by a leading edge and two side edges extending longitudinally along the slider body having an air bearing surface including a lead portion and first and second longitudinally extending rails coupled together via said lead portion,
   each of the first and second rails including a neck portion and a rear portion wherein said rear portion has a width greater than the neck portion, said lead portion and said first and second rails form a subambient pressure region in between the first and second rails when the slider body flies above a moving recording medium; each rear portion includes an inside rail edge facing said subambient pressure area, such that each of said inside rail edges forms an angle greater than 0° with a longitudinal axis of the slider; and
   a first secondary structure having a height less than a height for said first and second rails and disposed adjacent to one of said inside rail edges wherein when said slider is positioned over a moving medium, a pressure at said first secondary structure is less than one atmosphere.

2. The subambient pressure air bearing slider of claim 1 wherein the pressure at said first secondary structure is less than one atmosphere over all diameters of said moving medium.

3. The subambient pressure air bearing slider of claim 1 further comprising:
   a second secondary structure having a height less than the height for said first and second rails and disposed adjacent to another of said inside rail edges.

4. The subambient pressure air bearing slider of claim 3 wherein when said slider is positioned over a moving medium, pressure at said first and secondary structures is less than one atmosphere.

5. The subambient pressure air bearing slider of claim 4 wherein the pressure at said first and secondary structures is less than one atmosphere over all diameters of said moving medium.

6. A head suspension assembly comprising:
   a flexure;
   a slider coupled to said flexure, said slider including
      a slider body defined by a leading edge and two side edges extending longitudinally along the slider body having an air bearing surface including a lead portion and first and second longitudinally extending rails coupled together via said lead portion,
      each of the first and second rails including a neck portion and a rear portion wherein said rear portion has a width greater than the neck portion, said lead portion and said first and second rails form a subambient pressure region in between the first and second rails when the slider body flies above a moving recording medium; each rear portion includes an inside rail edge facing said subambient pressure area, such that each of said inside rail edges forms an angle greater than 0° with a longitudinal axis of the slider; and a first secondary structure having a height less than a height for said first and second rails and disposed adjacent to one of said inside rail edges wherein when said slider is positioned over a moving medium, a pressure at said first secondary structure is less than one atmosphere.

7. The head suspension assembly of claim 6 wherein the pressure at said first secondary structure is less than one atmosphere over all diameters of said moving medium.

8. The head suspension assembly of claim 6 wherein said slider further includes a second secondary structure having a height less than the height for said first and second rails and disposed adjacent to another of said inside rail edges.

9. The head suspension assembly of claim 8 wherein when said slider is positioned over a moving medium, pressure at said first and secondary structures is less than one atmosphere.

10. The head suspension assembly of claim 9 wherein the pressure at said first and secondary structures is less than one atmosphere over all diameters of said moving medium.

11. A disk drive comprising:
   a disk adapted to be rotated;
   a flexure; and
   a slider coupled to said flexure, said slider including
      a slider body defined by a leading edge and two side edges extending longitudinally along the slider body having an air bearing surface including a lead portion and first and second longitudinally extending rails coupled together via said lead portion,
      each of the first and second rails including a neck portion and a rear portion wherein said rear portion has a width greater than the neck portion, said lead portion and said first and second rails form a subambient pressure region in between the first and second rails when the slider body flies above a moving recording medium; each rear portion includes an inside rail edge facing said subambient pressure area, such that each of said inside rail edges forms an angle greater than 0° with a longitudinal axis of the slider; and
      a first secondary structure having a height less than a height for said first and second rails and disposed adjacent to one of said inside rail edges wherein when said slider is positioned over said disk when said disk is rotating, a pressure at said first secondary structure is less than one atmosphere.

12. The disk drive of claim 11 wherein the pressure at said first secondary structure is less than one atmosphere over all diameters of said moving medium.

13. The disk drive of claim 11 wherein said slider further includes a second secondary structure having a height less than the height for said first and second rails and disposed adjacent to another of said inside rail edges.

14. The disk drive of claim 13 wherein when said slider is positioned over said disk when said disk is rotating, a pressure at said first and secondary structures is less than one atmosphere.

15. The disk drive of claim 14 wherein the pressure at said first and secondary structures is less than one atmosphere over all diameters of said moving medium.

* * * * *